(12) United States Patent
Patel

(10) Patent No.: US 12,430,074 B2
(45) Date of Patent: Sep. 30, 2025

(54) MEMORY DEVICE COMMAND HISTORY MANAGEMENT

(71) Applicant: Micron Technology, Inc., Boise, ID (US)

(72) Inventor: Vipul Patel, Santa Clara, CA (US)

(73) Assignee: Micron Technology, Inc., Boise, ID (US)

(*) Notice: Subject to any disclaimer, the term of this patent is extended or adjusted under 35 U.S.C. 154(b) by 131 days.

(21) Appl. No.: 18/227,642

(22) Filed: Jul. 28, 2023

(65) Prior Publication Data
US 2024/0061616 A1 Feb. 22, 2024

Related U.S. Application Data

(60) Provisional application No. 63/399,304, filed on Aug. 19, 2022.

(51) Int. Cl.
*G06F 3/06* (2006.01)
(52) U.S. Cl.
CPC ......... *G06F 3/0659* (2013.01); *G06F 3/0616* (2013.01); *G06F 3/0679* (2013.01)

(58) Field of Classification Search
CPC ........................................................ G06F 3/06
See application file for complete search history.

(56) References Cited

U.S. PATENT DOCUMENTS

| | | | | |
|---|---|---|---|---|
| 9,037,778 B2 * | 5/2015 | Yoon | ...................... | G06F 3/0679 710/36 |
| 9,164,886 B1 * | 10/2015 | Phan | ...................... | G06F 3/0688 |
| 11,507,321 B1 * | 11/2022 | Veluswamy | .......... | G06F 3/0613 |
| 2020/0117392 A1 * | 4/2020 | Schaefer | ............... | G06F 3/0659 |
| 2020/0250107 A1 * | 8/2020 | Kazi | ...................... | G06F 3/0659 |

* cited by examiner

*Primary Examiner* — Khoa D Doan
(74) *Attorney, Agent, or Firm* — Lowenstein Sandler LLP

(57) ABSTRACT

A memory device including control logic to identify a command issued to the memory device to execute a memory access operation on one or more memory cells of a memory array of the memory device. The control logic determines a command type associated with the command and identifies, based on the command type, a subset of target information to be stored as part of a set of command information. The control logic stores, in a data store of the memory device, the set of command information associated with the command.

20 Claims, 13 Drawing Sheets

|  350₀  |  350₁  |  350₂  |  350₃  |
|---|---|---|---|
| Block₀ 250₀ | Block₀ 250₀ | Block₀ 250₀ | Block₀ 250₀ |
| Block₁ 250₁ | Block₁ 250₁ | Block₁ 250₁ | Block₁ 250₁ |
| Block₂ 250₂ | Block₂ 250₂ | Block₂ 250₂ | Block₂ 250₂ |
| Block₃ 250₃ | Block₃ 250₃ | Block₃ 250₃ | Block₃ 250₃ |
| Block₄ 250₄ | Block₄ 250₄ | Block₄ 250₄ | Block₄ 250₄ |
| ⋮ | ⋮ | ⋮ | ⋮ |
| Block_{L-4} 250_{L-4} | Block_{L-4} 250_{L-4} | Block_{L-4} 250_{L-4} | Block_{L-4} 250_{L-4} |
| Block_{L-3} 250_{L-3} | Block_{L-3} 250_{L-3} | Block_{L-3} 250_{L-3} | Block_{L-3} 250_{L-3} |
| Block_{L-2} 250_{L-2} | Block_{L-2} 250_{L-2} | Block_{L-2} 250_{L-2} | Block_{L-2} 250_{L-2} |
| Block_{L-1} 250_{L-1} | Block_{L-1} 250_{L-1} | Block_{L-1} 250_{L-1} | Block_{L-1} 250_{L-1} |
| Block_L 250_L | Block_L 250_L | Block_L 250_L | Block_L 250_L |
| 240₀ | 240₁ | 240₂ | 240₃ |

FIG. 3

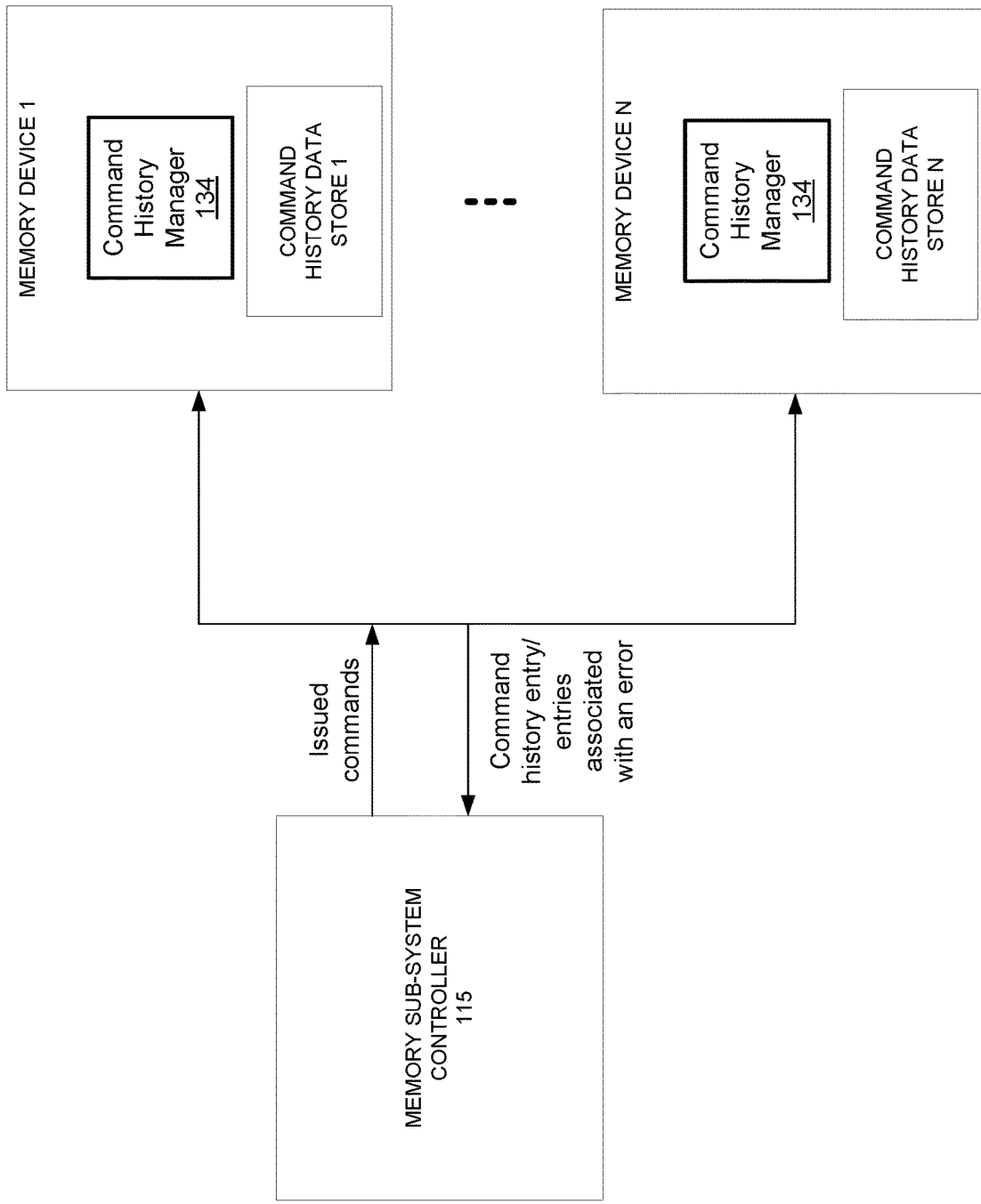

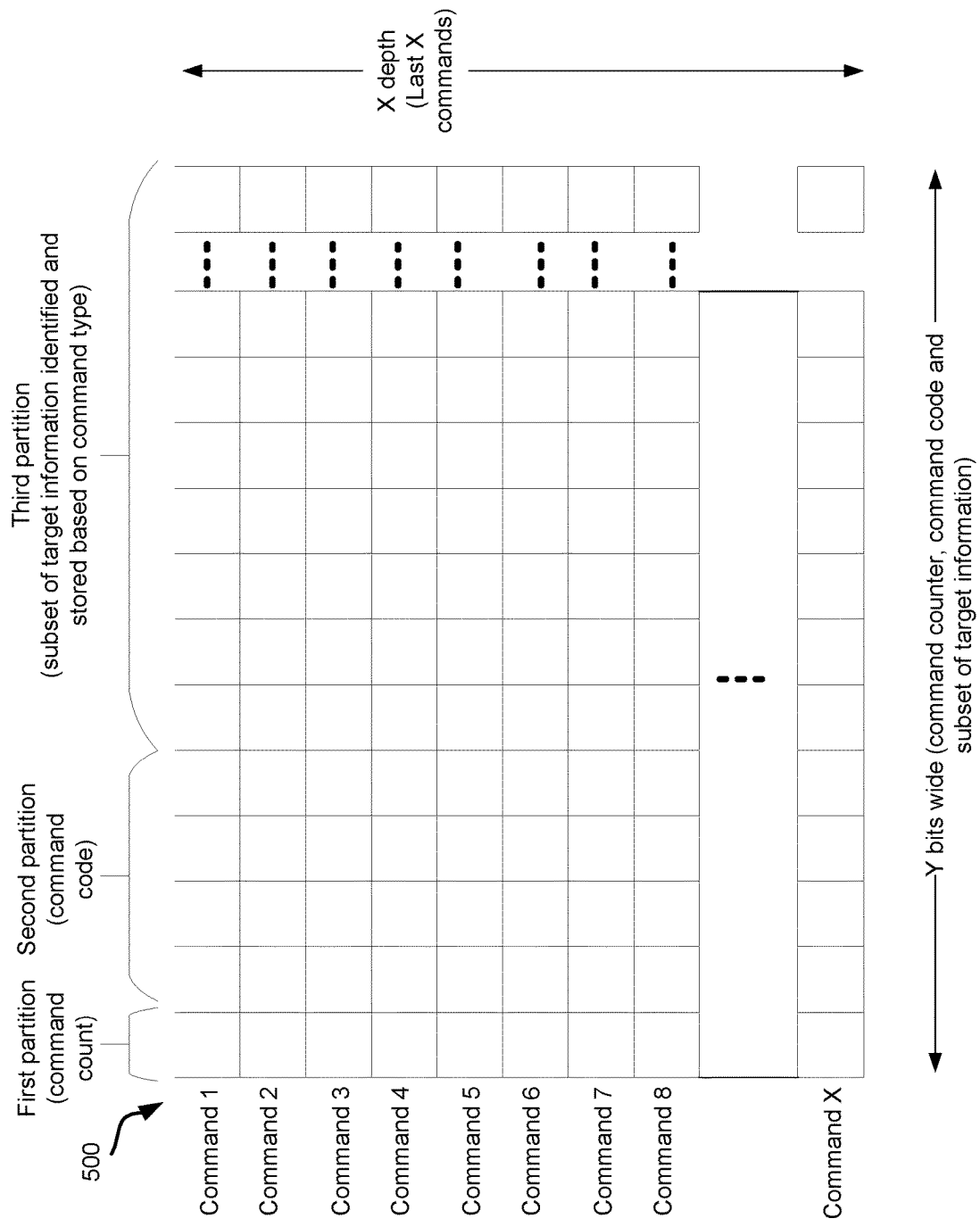

FIG. 6

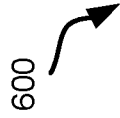

| COMMAND CODE | COMMAND TYPE | SUBSET OF TARGET INFORMATION |
|---|---|---|
| 0001 | TLC READ OPERATION | Planes activated, address information, status at completion, time stamp |
| 0010 | PROGRAM OPERATION | Planes activated, address information, status at completion, time stamp |
| 0011 | ERASE OPERATION | Planes activated, address information, status at completion, time stamp |
| 0100 | RESET OPERATION | Status at completion, time stamp |
| 0101 | SLC READ OPERATION | Planes activated, address information, status at completion, time stamp |
| 0110 | PARAMETER PAGE READ | Address information, status at completion, time stamp |
| 0111 | SET FEATURE | Planes activated, address information, status at completion, time stamp |
| 1000 | GET FEATURE | Feature address, status at completion, time stamp |
| 1001 | SET MEDIA-LOCAL-BUS INTERFACE (MLBI) | Trim address, status at completion, time stamp |
| 1010 | GET MLBI | Trim address, status at completion, time stamp |

FIG. 7

Read/Program/Erase Operation Commands 701

Count | Command Code | Memory Planes activated | ... | Block address | Time stamp | Status reported at completion SET/GET Feature Commands 702

Count | Command Code | Feature Address | ... | Time stamp | Status reported at completion SET/GET MLBI Commands 703

Count | Command Code | Trim Address | ... | Time stamp | Status reported at completion

MEMORY DEVICE COMMAND HISTORY MANAGEMENT

CROSS-REFERENCE TO RELATED APPLICATION

This application claims the benefit of U.S. Provisional Application No. 63/399,304, titled "Memory Device Command History Management," filed Aug. 19, 2022, which is hereby incorporated herein by reference in its entirety.

TECHNICAL FIELD

Embodiments of the disclosure relate generally to memory sub-systems, and more specifically, relate to storing and managing memory device command history.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a block schematic of a portion of an array of memory cells as could be used in a memory of the type described with reference to FIG. 1B, in accordance with one or more embodiments of the present disclosure.

FIG. 4 illustrates an example memory sub-system including a command history manager to identify and store information associated with one or more commands issued by a memory sub-system to a memory device of a set of memory devices, in accordance with one or more embodiments of the present disclosure.

FIG. 5 illustrates an example data structure (i.e., a command history data store) maintained and managed by a command history manager, in accordance with an embodiment of the present disclosure.

FIG. 6 illustrates an example data structure including an example mapping of command codes, command types, and the corresponding subset of target information, in accordance with an embodiment of the present disclosure.

FIG. 7 illustrates an example set of command types and corresponding command information that is stored in response to the issuance of a command, in accordance with embodiments of the present disclosure.

DETAILED DESCRIPTION

Figure 1A:
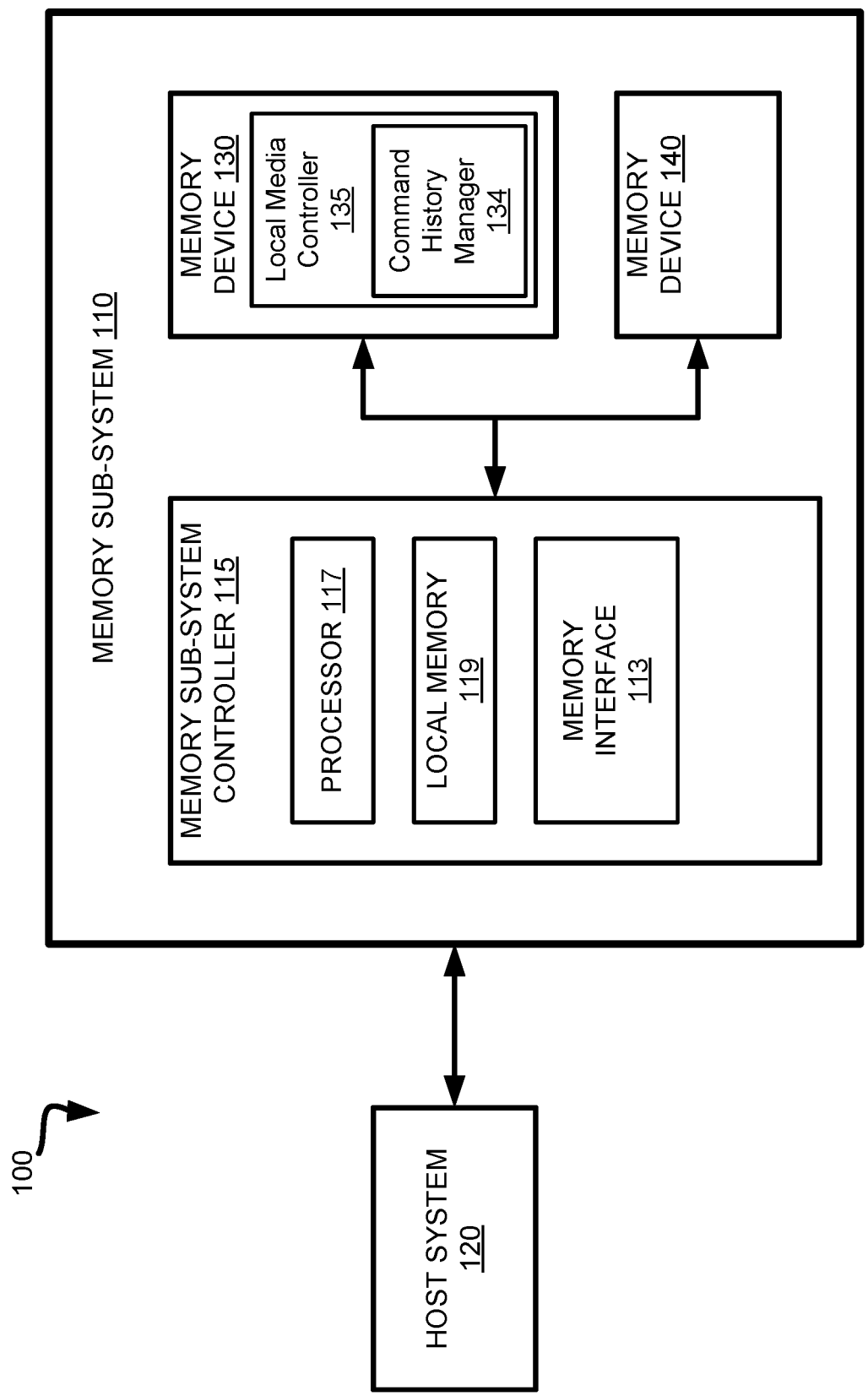
FIG. 1A illustrates an example computing system that includes a memory sub-system, in accordance with one or more embodiments of the present disclosure.

Aspects of the present disclosure are directed to storing and managing memory device command history. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIGS. 1A-1B. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device (e.g., a memory die) can include memory cells arranged in a two-dimensional or a three-dimensional grid. The memory cells are formed onto a silicon wafer in an array of columns and rows. The memory cells are joined by wordlines, which are conducting lines electrically connected to the control gates of the memory cells, and bitlines, which are conducting lines electrically connected to the drain electrodes of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

Some memory devices can be three-dimensional (3D) memory devices (e.g., 3D NAND devices). For example, a 3D memory device can include memory cells that are placed between sets of layers including a pillar (e.g., polysilicon pillar), a tunnel oxide layer, a charge trap (CT) layer, and a dielectric (e.g., oxide) layer. A 3D memory device can have a "top deck" corresponding to a first side and a "bottom deck" corresponding to a second side. Without loss of generality, the first side can be a drain side and the second side can be a source side. For example, a 3D memory device can be a 3D replacement gate memory device having a replacement gate structure using wordline stacking.

One type of cell is a single level cell (SLC), which stores 1 bit per cell and defines 2 logical states ("states") ("1" or "L0" and "0" or "L1") each corresponding to a respective VT level. For example, the "1" state can be an erased state and the "0" state can be a programmed state (L1). Another type of cell is a multi-level cell (MLC), which stores 2 bits per cell (1 bit for upper page (UP) data and 1 bit for lower page (LP) data) and defines 4 states ("11" or "L0", "10" or "L1", "01" or "L2" and "00" or "L3") each corresponding to a respective V T level. For example, the "11" state can be an erased state and the "01", "10" and "00" states can each be a respective programmed state. Another type of cell is a triple level cell (TLC), which stores 3 bits per cell (1 bit for UP data, 1 bit for LP data and 1 bit for extra page (XP) data) and defines 8 states ("111" or "L0", "110" or "L1", "101" or "L2", "100" or "L3", "011" or "L4", "010" or "L5", "001" or "L6", and "000" or "L7") each corresponding to a respective V T level. For example, the "111" state can be an erased state and each of the other states can be a respective programmed state. Another type of a cell is a quad-level cell (QLC), which stores 4 bits per cell (1 bit for UP data, 1 bit for LP data, 1 bit for XP data, and 1 bit for top page (TP) data) and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use $2^n$ levels of charge to store n bits of information for n pages. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of cells.

One or more memory access operations (e.g., erase operations, program operations, read operations, etc.) can be performed with respect to the memory cells of the memory device. In an illustrative example, a memory cell programming operation, which can be performed in response to receiving a program or write command from the host, can involve sequentially applying programming voltage pulses to a selected or target wordline (WLn). In some implementations, the programming pulse voltage can be sequentially ramped up from the initial voltage value (e.g., 0 V) to the final voltage value (e.g., $V_{MAX}$). The unselected wordlines can, during the programming operation, be biased at a certain voltage, e.g., a pass voltage, which is less than the programming voltage. After each programming pulse, or after a number of programming pulses, a program verify operation can be performed to determine if the threshold voltage of the one or more memory cells has increased to a desired programming level.

A memory access operation can be executed on the memory device in response to a command. Each command can be processed in a sequence for execution on the one or more memory devices (e.g., one or more memory dies) of the memory sub-system. The memory sub-system may log or store information relating to planned commands (e.g., based on requests from a host system), but not information relating to the commands that are issued to the one or more memory devices.

Certain operations performed in response to a command can experience an error or failure. In some systems, when a failure occurs related to a memory device, there are limited options available to determine a root cause of the failure. Failures that occur with respect to a memory device after the memory device is integrated into an end product, there is no access to the memory device itself for purposes of troubleshooting the issue. One approach to determining the cause of a failure is to use specific, preset tests to attempt to replicate the issue and use a logic analyzer to capture the command sequence associated with the issue (e.g., the one or more commands that occurred at the time of the failure). However, this approach is time-consuming (e.g., can consume weeks of effort for issues that are difficult to replicate) and involve support from multiple engineering resources. Furthermore, capturing the failure may require modifying the firmware code of the memory sub-system and/or memory device. Moreover, this approach can require adding additional hardware to the memory sub-system which can impact the original failure and make the failure even more difficult to replicate.

Memory devices are increasingly being used in more critical applications (e.g., autonomous driving applications) for which the root cause of a memory device failure must be determined in an accurate and timely manner. Furthermore, failures in such cases can be intermittent or one-time field failures which are very difficult to root cause unless there is data available to indicate what was occurring at the time of the failure. However, such systems lack any mechanism in the memory device to assist in the analysis of failures (e.g., intermittent or one-time failures), particularly in critical applications.

Aspects of the present disclosure address the above and other deficiencies by tracking, storing, and managing data associated with a set of memory access operation commands executed by a memory device of a memory sub-system. Embodiments described herein can include logic (i.e., a command history manager) of a local media controller of the memory device to maintain a storage location (also referred to as a "command history data store") to store a set of information relating to each issued command of a set of issued commands (e.g., X number of commands). According to embodiments, the command history manager of a memory device collects and stores an entry for each command issued to the memory device. For each issued command, the entry includes a set of information (herein the "command information"). The command history manager can maintain a mapping of a command type or category and the type of data that is to be collected as part of the set of command information. The subset of data (also referred to as the "subset of target information") that is collected as part of the command information can be based on the type of command. For example, a first command type (e.g., a read operation) can be associated with a first subset of target information that is collected and stored in response to the issuance of a command having the first command type. In this example, the first subset of target information can include multiple elements of information including one or more activated memory planes, address information, a time stamp (i.e., a time when the command was issued), a status upon completion (e.g., a successful completion status value ("0") or a failed status value ("1"). Accordingly, the command history manager stores an entry in the command history data store that includes the set of command information including a command count (e.g., a sequential numerical identifier representing the number or count of the issued command), a command code (i.e., a code identifying the type of command), and the subset of target information that corresponds to the command type.

Advantageously, the stored command history (i.e., the command information relating to the set of X issued commands) can be used to determine a root cause of a failure during a subsequent root cause analysis. In response to the identification or detection of an error (e.g., drive assert, status error, UECC error, etc.), information stored in the command history data store associated with the one or more failing memory devices can be retrieved (e.g., by the memory sub-system controller) as part of a failure analysis protocol (e.g., a standard error management flow). According to embodiments, the command history can be used to identify an illegal sequence or illegal sequence combination (e.g., system related issues), provide a history executed commands to help replicate memory device failures (e.g., memory device bug issues), and resolve one-time in-field failures in critical applications.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory page buffers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can implement a command history manager 134 to manage the identification and storage of information relating to issued memory access commands. For example, the command history manager 134 can identify a type of issued command and further identified a subset of information associated with the identified command type. The command history manager 134 can maintain a command history data store (e.g., a data structure) to track issued commands and related command history information. In an embodiment, each entry in the command history data store corresponds to an issued command and the associated command history information. The command history data store managed by the command history manager 134 can store a set of entries corresponding to a set of the most recently issued commands. For example, the command history data store can include X number of entries, which are managed on a first-in first-out (FIFO) scheme, where a first command is overwritten by the X+1 command.

Figure 1B:
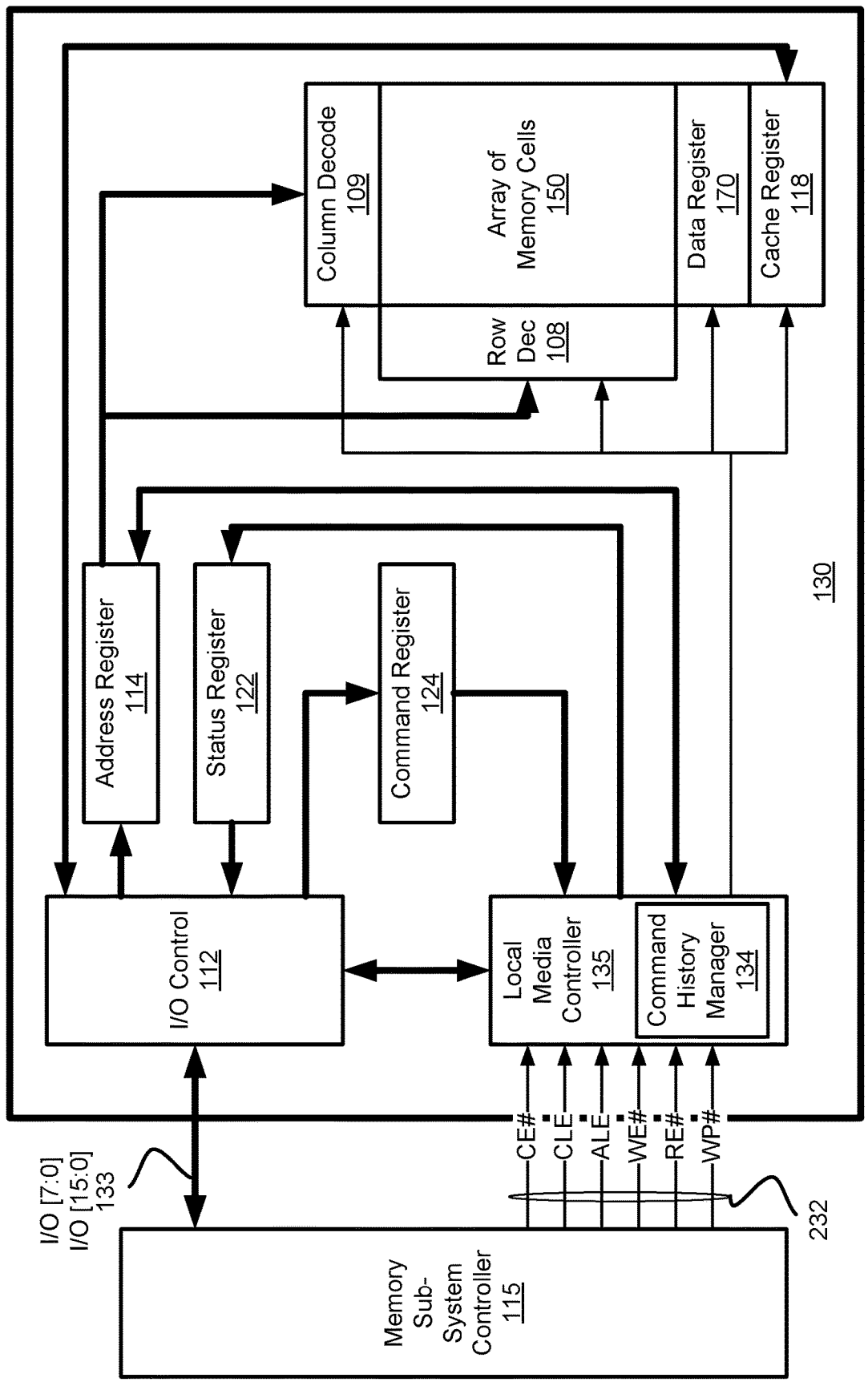
FIG. 1B is a block diagram of a memory device in communication with a memory sub-system controller of a memory sub-system, in accordance with one or more embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 112 to manage input of commands, addresses and data to the memory device 130 as well as output of data and status information from the memory device 130. An address register 114 is in communication with I/O control circuitry 112 and row decode circuitry 108 and column decode circuitry 109 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, local media controller 135 includes the command history manager 134, which can implement the command history identifying and storing process to facilitate subsequent root cause analysis associated with a memory device-related failure.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 112. During a read operation, data may be passed from the cache register 118 to the I/O control circuitry 112 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status page buffer 122 may be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 112 and may then be written into command register 124. The addresses may be received over input/output (I/O) pins [7:0] of I/O bus 136 at I/O control circuitry 112 and may then be written into address register 114. The data may be received over input/output (I/O) pins [7:0] for an 8-bit device or input/output (I/O) pins [15:0] for a 16-bit device at I/O control circuitry 112 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
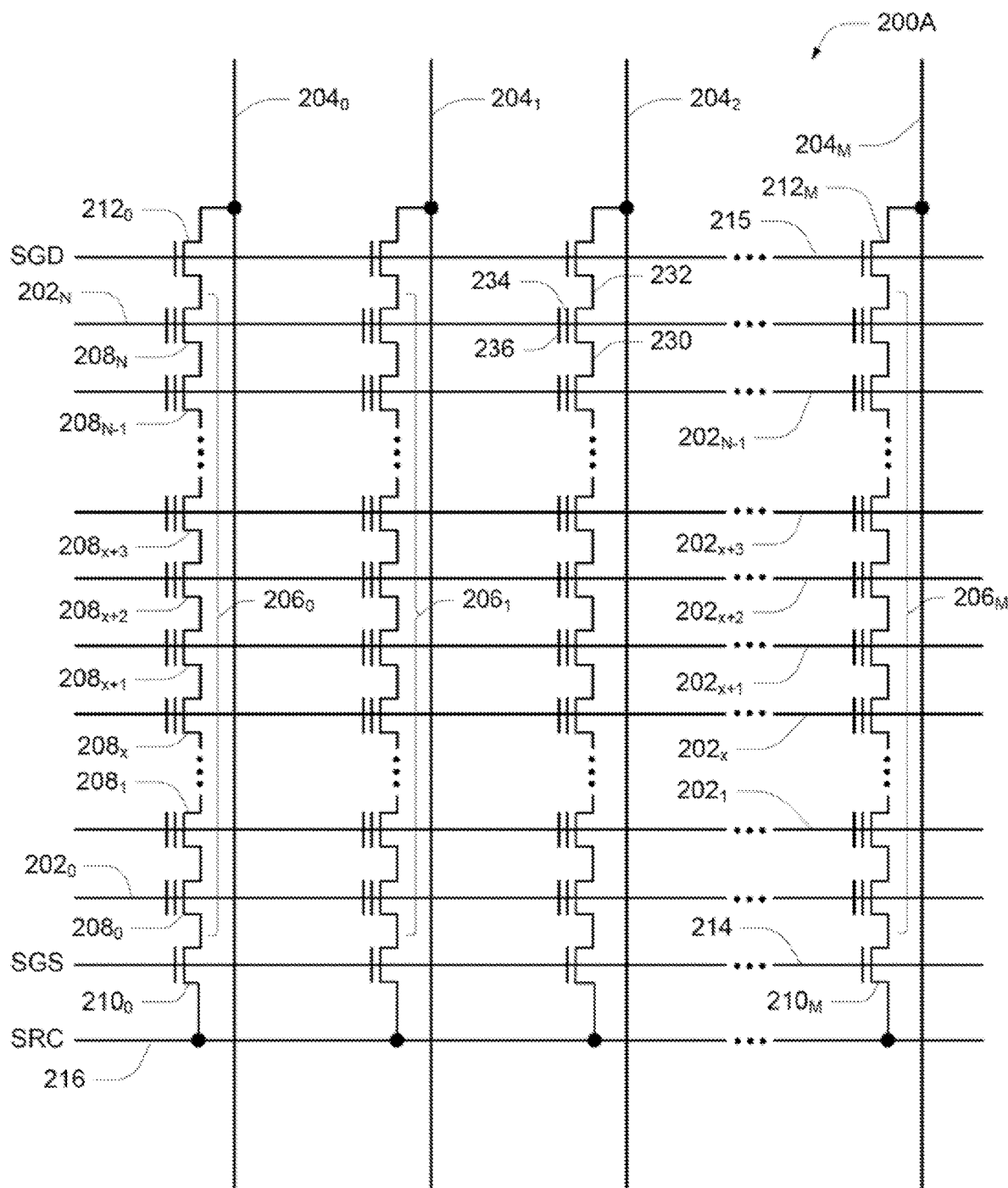
FIG. 2A-2C are schematics of portions of an array of memory cells as could be used in a memory of the type described with reference to FIG. 1B, in accordance with one or more embodiments of the present disclosure.
Figure 2B:
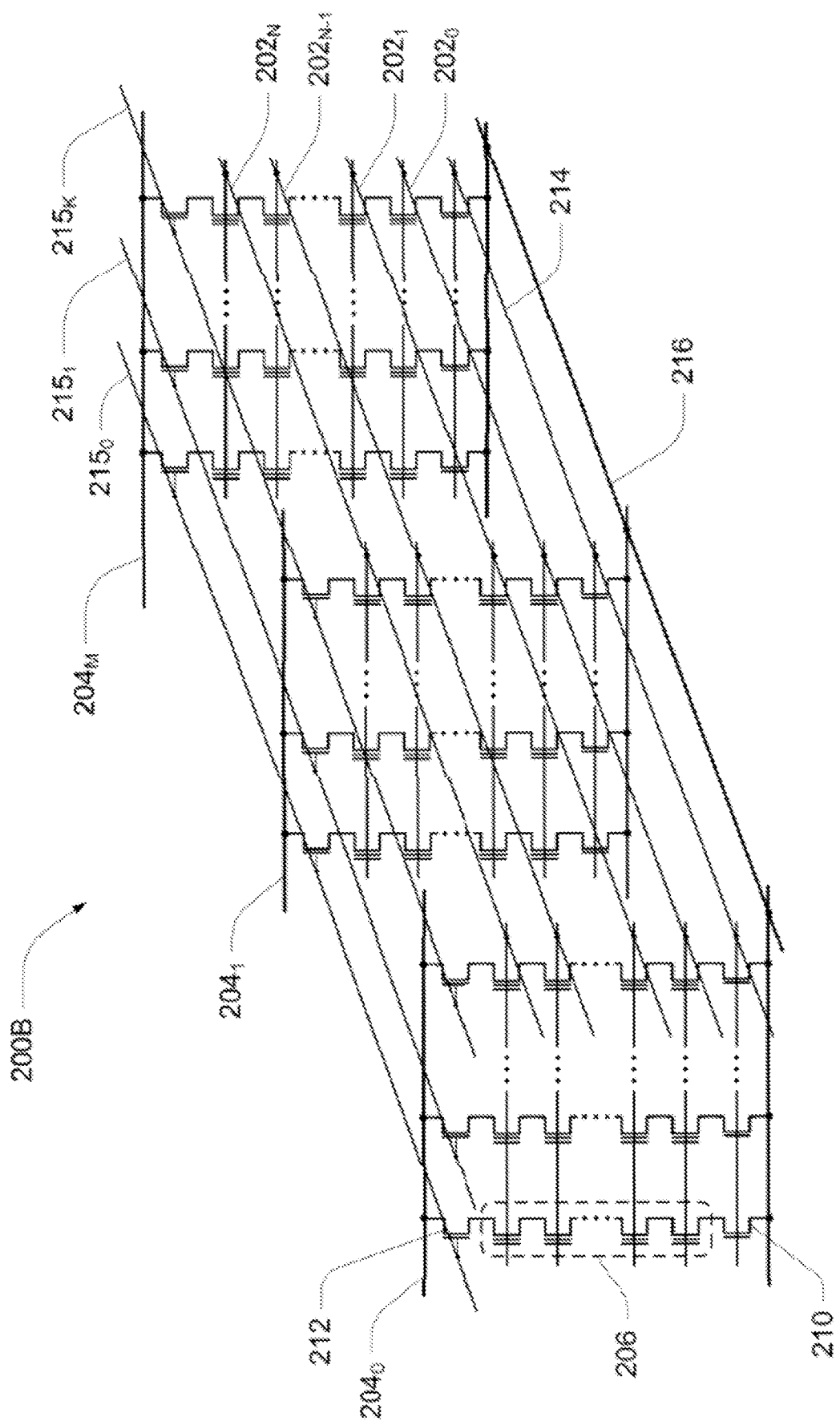
Figure 2C:
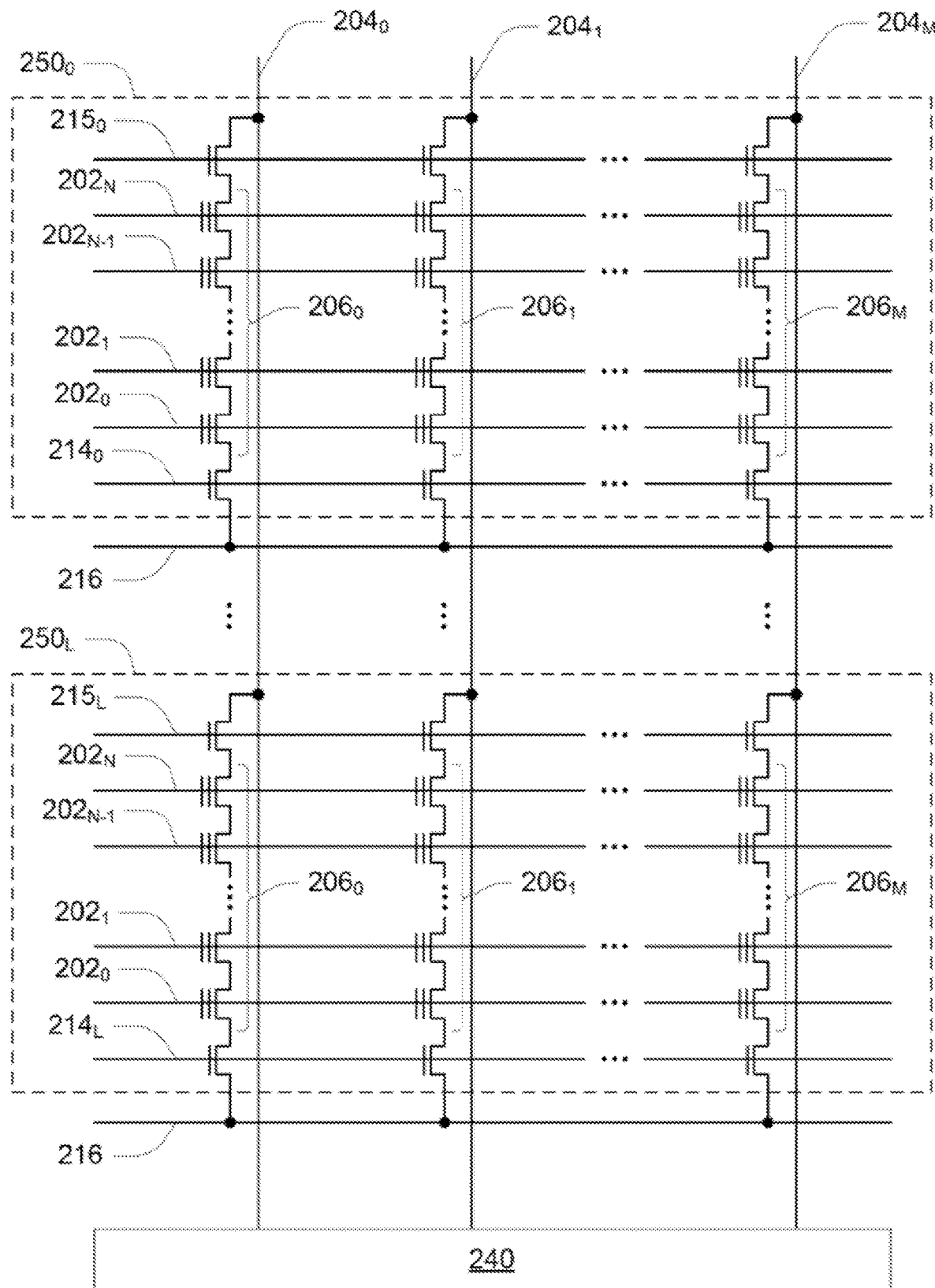

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells.

The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of an wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

FIG. 3 is a block schematic of a portion of an array of memory cells 300 as could be used in a memory of the type described with reference to FIG. 1B. The array of memory cells 300 is depicted as having four memory planes 350 (e.g., memory planes $350_0$-$350_3$), each in communication with a respective buffer portion 240, which can collectively form a page buffer 352. While four memory planes 350 are depicted, other numbers of memory planes 350 can be commonly in communication with a page buffer 352. Each memory plane 350 is depicted to include L+1 blocks of memory cells 250 (e.g., blocks of memory cells $250_0$-$250_L$).

FIG. 4 illustrates an example memory sub-system including a command history manager 134 to identify and store information associated with one or more commands issued by a memory sub-system 115 to a memory device of a set of memory devices (e.g., memory device 1 through memory device N). As shown in FIG. 4, each memory device includes logic (i.e., command history manager 134) to manage a command history data store (e.g., command history data store 1 of memory device 1 and command history data store N of memory device N). According to embodiments, each command history manager 134 identifies the commands issued to the memory device and stores information relating to each command issued to the memory device. The set of command information can include a command count, a command code corresponding to the type of command, and a subset of target information. The command history manager 134 can maintain a mapping of a command type or category, the corresponding command code, and an identification of one or more data elements that are to be collected and stored as part of the subset of target information. For example, a first command type (e.g., a program operation) can be associated with a first subset of target information that is collected and stored in response to the issuance of a command having the first command type (e.g., a program operation). In this example, the first subset of command information can include multiple elements of information including an identification of one or more activated memory planes, address information, a time stamp (i.e., a time when the command was issued), a status upon completion (e.g., a successful completion status value ("0") or a failed status value ("1").

As illustrated in FIG. 4, in response to the identification of an error or failure (e.g., a status upon completion value of "1" stored in the corresponding entry of the command history data store as part of the subset of target information) associated with a memory device, the memory sub-system controller 115 can initiate an operation to read out one or more entries of the command history data store associated with the one or more memory devices that exhibited the error or failure. According to embodiments, the memory sub-system controller 115 can use a memory device protocol (e.g., a system debug mode protocol, etc.) to communicate with the command history manager 134 to enable the collection of the command history data from the one or more command history data stores. Advantageously, the memory sub-system controller 115 can log the command history data associated with an error or failure for use in a root cause failure analysis procedure.

FIG. 5 illustrates an example data structure (i.e., a command history data store) 500 maintained and managed by the command history manager (e.g., command history manager 134 of FIGS. 1A, 1B, and 4). As shown, the command history data store 500 can be configured to store X number of the commands most recently issued to the memory device. As shown, the command history data store 500 includes a set of entries corresponding to the issued commands (e.g., command 1, command 2, command 3 . . . command X). According to embodiments, the command history manager can monitor the command count associated with a particular memory device (e.g., the commands issued to a respective memory device) and determine if a condition is met such that the command history data store is full. For example, the condition can be met when the command count reaches the maximum command count (X) plus one (e.g., X+1). The command information relating to the X+1 command can overwrite the first entry of the command history data store. For example, with respect to the command history data store 500 of FIG. 5, the entry for command 1 is overwritten by the command history manager with the command information for command X+1, the entry for command 2 is overwritten by the command history manager with the command information for command X+2, and so on, in accordance with a first-in first-out protocol.

For each entry (i.e., each command issued to the memory device), a set of command information is stored. For example, each entry can include Y number of bits of stored data relating to each issued command. In an embodiment, the number of bits (Y) can be in the range of approximately 32 bits to approximately 128 bits. As illustrated in FIG. 5, the command history manager stores the Y number of bits of command information for each issued command. According to embodiments, the command information can include a first partition or portion including a command count (e.g., a sequential number of the commands based on an order or issuance), a second partition or portion including a command code associated with the type of command, and a third partition or portion including a subset of target information identified and stored based on the command type. According to embodiments, the command history manager identifies a type or category of the issued command and uses a data structure including a mapping between a corresponding command code and a subset of target information that is to be identified and stored for the corresponding command type.

FIG. 6 illustrates an example data structure 600 including an example mapping of command codes, command types, and the corresponding subset of target information. As shown in the example of FIG. 6, a unique command code (e.g., a 4-bit value such as 0001, 0010, 0011 . . . 1010) is associated with each respective command type (e.g., a TLC read operation command, a program operation command, an erase operation command, a reset operation command, an SLC read operation command, a parameter page read command, a set feature command, a get feature command, a set media-local-bus interface (MLBI) command, a get MLBI, etc.). According to embodiments, each command type, as represented by a corresponding command code, is associated with or mapped to a subset of target information that is to be collected and stored in the command history data store (i.e., the third partition or portion of the command information shown in FIG. 5).

As shown in the example of FIG. 6, a first command type (i.e., a TLC read operation command having command code 0001) is mapped to a first subset of target information including information identifying the one or more activated planes, address information, a status at completion, and a time stamp. In the example shown, each different command type is associated with a corresponding subset of target information. According to embodiments, in response to the issuance of a command, the command history manager identifies the command type and, using the data structure 600, identifies the subset of target information to be collected and stored. For example, in response to the issuance of an erase operation, the command history manager identifies the corresponding command code (e.g., 0011) and the subset of target information including information identifying the one or more activated planes, address information, status at completion (e.g., an indication that the erase operation executed successfully or an indication that the erase operation failed). According to embodiments, the command history manager can update, revise, or alter the subset of target information corresponding to each command type. For example, the command history manager can add an additional data element to be collected and stored for a particular command type to enable the use of the additional data element in a subsequent error management process.

FIG. 7 illustrates an example set of command types and corresponding command information that is stored in accordance with embodiments of the present disclosure. As shown in FIG. 7, in response to identification of read, program, or erase operation commands 701, the command history manager generates an entry for storage in the command history data store, where the entry includes a command count, a command code, information identifying the one or more activated memory planes, memory block address information, a time stamp, and a status reported at completion of the operation (e.g., a "0" indicating a successfully executed operation or a "1" indicating a failed execution of the operation).

As shown in FIG. 7, in response to identification of set feature command or a get feature command 702, the command history manager generates an entry for storage in the command history data store, where the entry includes a command count, a command code, feature address information, a time stamp, and a status reported at completion of the operation (e.g., a "0" indicating a successfully executed operation or a "1" indicating a failed execution of the operation).

As shown in FIG. 7, in response to identification of set MLBI feature command or a get MLBI feature command 703, the command history manager generates an entry for storage in the command history data store, where the entry includes a command count, a command code, trim address information, a time stamp, and a status reported at completion of the operation (e.g., a "0" indicating a successfully executed operation or a "1" indicating a failed execution of the operation).

Figure 8:
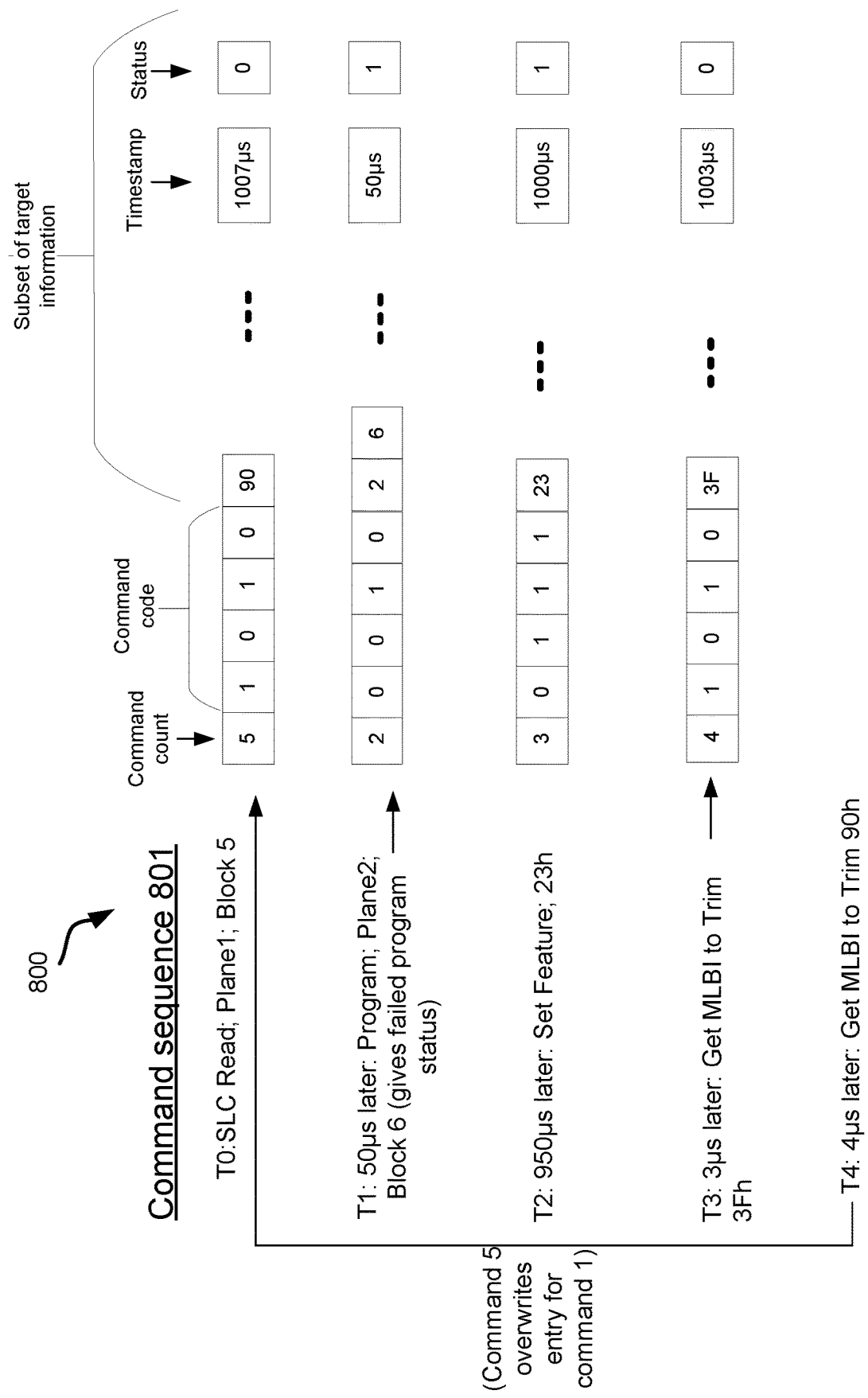
FIG. 8 illustrates an example command history data store having a set of rows each corresponding to a command history entry associated with a command sequence, in accordance with embodiments of the present disclosure.

FIG. 8 illustrates an example command history data store 800 having an example depth of 4 command entries (i.e., X=4) storing information associated with a command sequence 801. As shown in FIG. 8, the command sequence 801 includes a first command issued at time T0 which relates to an SLC read operation of memory plane 1, memory block 5. The command sequence 801 further includes a second command issued at time T1 (50 µs after T0) which relates to a program operation of memory plane 2, memory block 6, a third command issued at time T2 (950 us after T1) which relates to a set feature operation associated with 23h, and a fourth command issued at time T3 (3 µs after T2) which relates to a get MLBI operation associated with trim 3Fh. In the example shown, the command sequence 801 includes a fifth command is issued at time T4 (4 µs after T3) which relates to a get MLBI operation associated with trim 90h. As shown in FIG. 8, since the command history data store includes a 4-entry depth (i.e., X=4), the command history manager overwrites the first command (received at T0) with the fifth command (received at T4). According to embodiments, the command history manager identifies and stores the command information (e.g., the command count, the command code, and the subset of target information) for each issued command, as shown in FIG. 8. In an embodiment, the command history manager can maintain a timestamp threshold that can be used to reset the timestamp clock. For example, the timestamp threshold can be 1 minute, such that the timestamp value is reset to zero once the reset threshold is met (e.g., when the timestamp clock reaches 1 minute).

Figure 9:
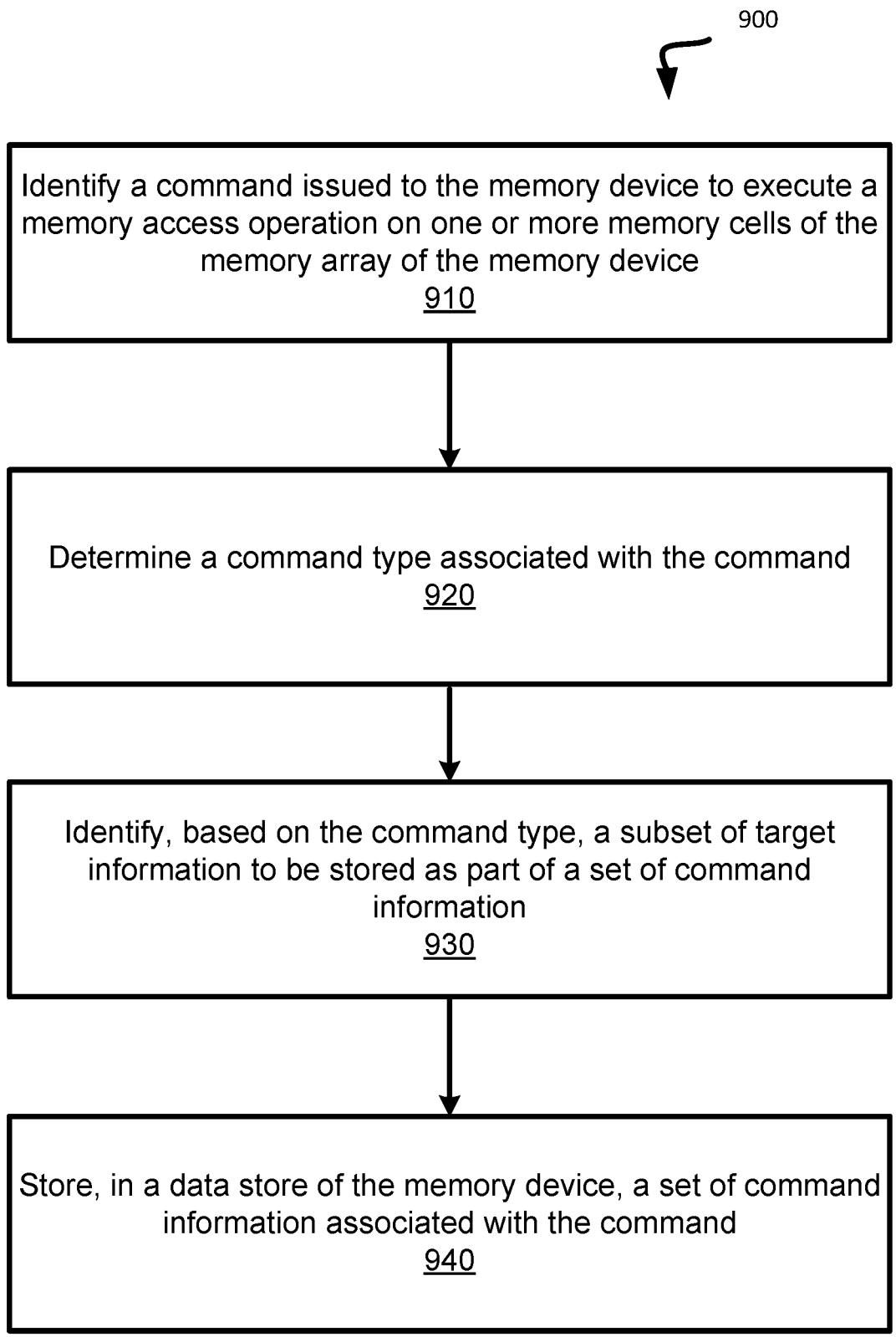
FIG. 9 is a flow diagram of an example method to manage information associated with commands issued to a memory device, in accordance with some embodiments of the present disclosure.

FIG. 9 is a flow diagram of an example method 900 to identify and store information associated with a command issued to a memory device, in accordance with some embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the command history manager 134 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 910, a command is identified. For example, processing logic (e.g., command history manager of FIGS. 1A-1B and FIG. 4) can identify a command issued to the memory device to execute a memory access operation on one or more memory cells of the memory array of the memory device. In an embodiment, the command can be issued to a memory device of a set of memory devices in response to a request initiated by a host system of a memory sub-system. Example memory access operations can include a read operation, a program operation, an erase operation, a reset operation, a parameter page read operation, a set feature operation, a get feature operation, a set MLBI operation, and a get MLBI operation. According to embodiments, each memory device of the memory sub-system includes processing logic to identify the commands that are issued to the respective memory devices (e.g., memory dies).

At operation 920, a type of a command is determined. For example, the processing logic determines a command type associated with the command. In an embodiment, the processing logic examines the command issued to the memory device and determine the type or category of the command (e.g., a read operation command, a program operation command, an erase operation command, etc.). At operation 930, information is identified. For example, the processing logic identifies, based on the command type, a subset of target information to be stored as part of a set of command information. In an embodiment, the processing logic maintains a data structure that maps each command type to a particular subset of target information. In an embodiment, the subset of target information is defined as useful for purposes of performing a subsequent error analysis in response to an error or failure associated with the corresponding command type. An example data structure including an example mapping of subsets of target information to respective command codes and command types is shown in FIG. 6.

At operation 940, information is stored. For example, the processing logic can store, in a data store of the memory device, a set of command information associated with the command. In an embodiment, the set of command information includes a command count (e.g., a sequential number of the count assigned by a counter of the processing logic), a command code associated with the command, and a subset of target information. In an embodiment, a command type of the command is identified. Based on the command type, the command code (e.g., a 4-bit value) is identified (e.g., the command code associated with the command type, as shown in FIG. 6).

Advantageously, the subset of target information can include data that can be used for executing a subsequent error or failure analysis. In an embodiment, the data store can include a set of entries, where each entry corresponds to a command issued to the memory device. In response to detection of an error or failure relating to a memory access operation, the stored command information can be identified and used in a subsequent error or failure analysis procedure (e.g., a root cause analysis). For example, the command information that is stored can be provided to a memory sub-system controller for use in determining a root cause associated with a memory device failure, an illegal sequence of commands, an illegal sequence combination, or a timing issue associated with one or more commands (e.g., issuing a command too soon or too late).

Figure 10:
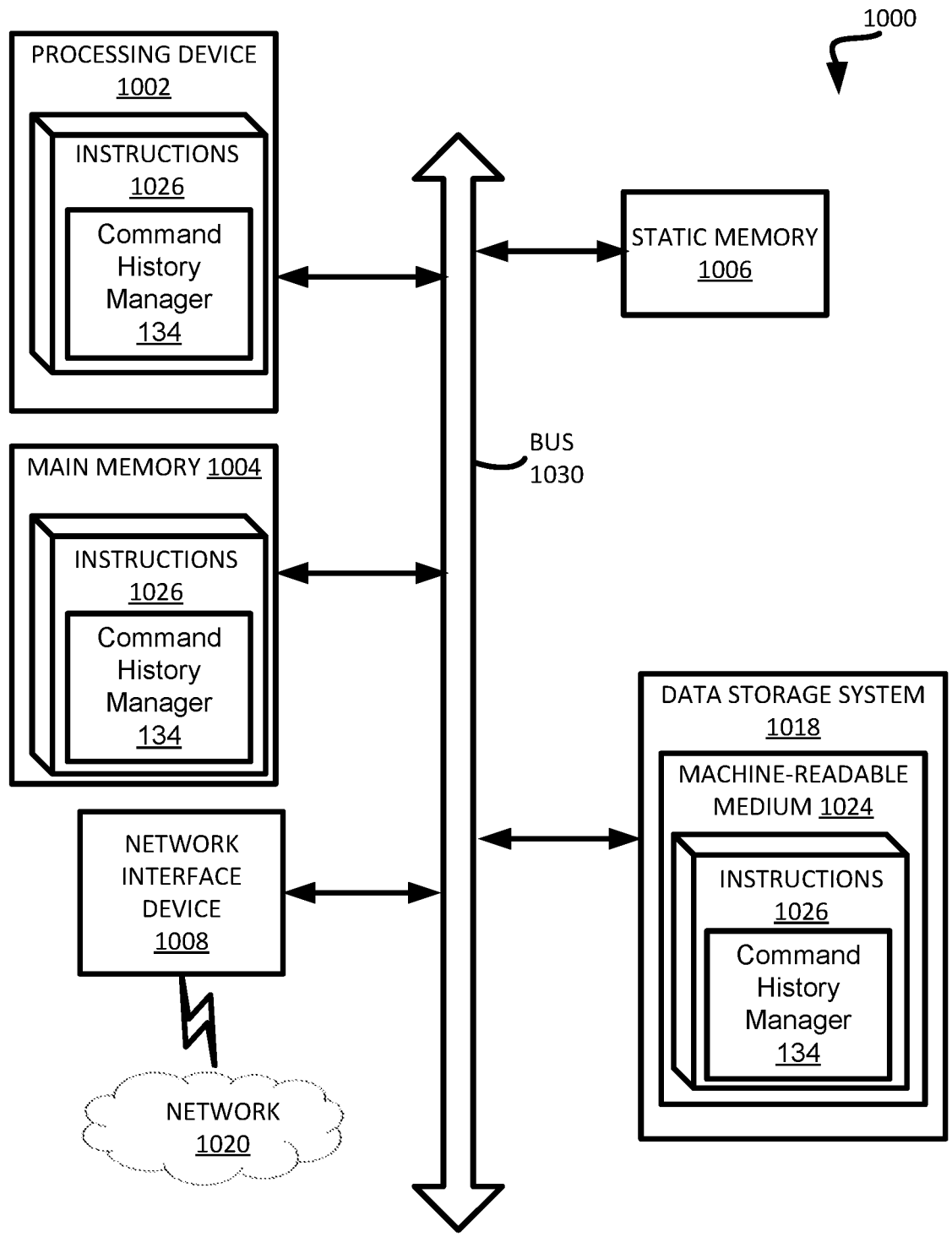
FIG. 10 is a block diagram of an example computer system in which embodiments of the present disclosure may operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the command history manager 134 of FIG. 1A and FIG. 1B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise)

that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or RDRAM, etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 602 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 804 can correspond to the memory sub-system 110 of FIG. 1A.

In one embodiment, the instructions 1026 include instructions to implement functionality corresponding to a CR component (e.g., the command history manager 134 of FIG. 1A and FIG. 1B). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's page buffers and memories into other data similarly represented as physical quantities within the computer system memories or page buffers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a memory array; and
control logic, operatively coupled with the memory array, to perform operations comprising:
identifying a command issued to the memory device to execute a memory access operation on one or more memory cells of the memory array of the memory device;
identifying first information associated with the command;
determining a command type associated with the command;
identifying, based on the command type, a first subset of target information of a plurality of subsets of target information;
generating a set of command information comprising the first information and the first subset of target information; and
storing, in a data store of the memory device, the set of command information associated with the command.

2. The memory device of claim 1, wherein the first subset of target information indicating indicates a failed status of the memory access operation associated with the command.

3. The memory device of claim 2, the operations further comprising:
providing at least a portion of the set of command information to a memory sub-system controller for analysis of the failed status of the memory access operation.

4. The memory device of claim 1, the operations further comprising maintaining a data structure comprising a set of command codes, where each command code of the set of command codes is associated with a corresponding command type and a corresponding subset of target information.

5. The memory device of claim 4, the operations further comprising:
identifying a first command type of the command; and
using the data structure, identifying the first subset of target information corresponding to the command type, wherein an entry in the data store is generated corresponding to the command.

6. The memory device of claim 5, wherein the first information comprises a command count and a first command code associated with the first command type.

7. The memory device of claim 1, wherein the first information comprises one or more of a command count or a command code associated with the command; and wherein the first subset of target information comprises one or more of a timestamp associated the command, and or a status of execution of the memory access operation.

8. A method comprising:
identifying, by a processing device, a command issued to a memory device to execute a memory access operation on one or more memory cells of a memory array of the memory device;
identifying first information associated with the command;
determining a command type associated with the command;
identifying, based on the command type, a first subset of target information of a plurality of subsets of target information;
generating a set of command information comprising the first information and the first subset of target information; and
storing, in a data store of the memory device, the set of command information associated with the command.

9. The method of claim 8, wherein the first subset of target information indicates a failed status of the memory access operation associated with the command.

10. The method of claim 9, wherein the first information comprises a command count and a first command code associated with the first command type.

11. The method of claim 8, further comprising maintaining a data structure comprising a set of command codes, where each command code of the set of command codes is associated with a corresponding command type and a corresponding subset of target information.

12. The method of claim 11, further comprising:
identifying a first command type of the command; and
using the data structure, identifying the first subset of target information corresponding to the first command type, wherein an entry in the data store is generated corresponding to the command.

13. The method of claim 12, wherein the first information comprises a command count and a first command code associated with the first command type.

14. The method of claim 8, wherein the first information comprises one or more of a command count or a command code associated with the command; and wherein the first subset of target information comprises one or more of a timestamp associated the command, and or a status of execution of the memory access operation.

15. A non-transitory computer-readable storage medium comprising instructions that, when executed by a processing device, cause the processing device to perform operations comprising:
identifying a command issued to a memory device to execute a memory access operation on one or more memory cells of a memory array of the memory device;
identifying first information associated with the command;
determining a command type associated with the command;
identifying, based on the command type, a first subset of target information of a plurality of subsets of target information;
generating a set of command information comprising the first information and the first subset of target information; and
storing, in a data store of the memory device, the set of command information associated with the command.

16. The non-transitory computer-readable storage medium of claim 15, wherein the first subset of target information indicates a failed status of the memory access operation associated with the command.

17. The non-transitory computer-readable storage medium of claim 16, the operations further comprising providing at least a portion of the set of command information to a memory sub-system controller for analysis of the failed status of the memory access operation.

18. The non-transitory computer-readable storage medium of claim 15, the operations further comprising maintaining a data structure comprising a set of command codes, where each command code of the set of command codes is associated with a corresponding command type and a corresponding subset of target information.

19. The non-transitory computer-readable storage medium of claim 18, the operations further comprising:
identifying a first command type of the command; and
using the data structure, identifying the first subset of target information corresponding to the first command type, wherein an entry in the data store is generated corresponding to the command.

20. The non-transitory computer-readable storage medium of claim 15, wherein the set of command information comprises one or more of a command count or a command code associated with the command; and wherein the first subset of target information associated with the command, and wherein the first subset of target information comprises one or more of a timestamp associated the command, and or a status of execution of the memory access operation.

* * * * *